May 18, 1965 J. RISEMAN ETAL 3,183,567

MANUFACTURING MAGNETIC STORAGE MATRICES

Filed March 31, 1961

INVENTORS
JACOB RISEMAN
JOSEPH G. CHRIST
RAYMOND F. SANKUER

BY

ATTORNEY 3,183,567

MANUFACTURING MAGNETIC STORAGE MATRICES

Jacob Riseman, Poughkeepsie, Joseph G. Christ, Lagrangeville, and Raymond F. Sankuer, Poughkeepsie, N.Y., assignors to International Business Machines Corporation, New York, N.Y., a corporation of New York Filed Mar. 31, 1961, Ser. No. 99,739
1 Claim. (Cl. 29—155.5)

Figure 1A:
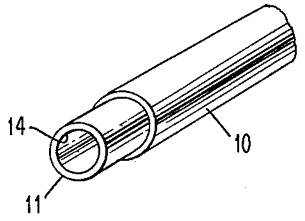

The present invention relates generally to information storage matrices and more particularly to matrices employing bistable magnetic elements as storage cells.

Magnetic element storage matrices are well known in the information handling arts. Conventional storage matrices comprise a plurality of bistable magnetic elements, usually toroidal ferrite cores, arranged in a coordinate array. A plurality of separate coordinate excitation means, normally in the form of row and column coils, are inductively coupled to the cores along the rows and columns of the matrix so that each core is individually identifiable in terms of a specific combination of one row coil and one column coil. The row and column coils are selectively energizable, energization of one coil alone being insufficient to switch the magnetic cores coupled thereto from one magnetic remanent state to another, but the additive magnetic effects of two energized windings upon a core being sufficient to effect a change of state thereof. With this arrangement, it is possible to individually alter the state of any selected core in the matrix by coincidentally energizing a single row winding and a single column winding which intersect at that core.

Storage systems employing matrices of the type just described for storing binary information in either two or three dimensions are well known in the art. For example, U.S. Patent 2,960,683 to W. D. Winger et al. describes a conventional three dimensional magnetic memory system. U.S. Patent 2,708,267 to J. A. Weidenhammer discloses a typical two dimensional memory system.

According to the present invention, there is provided a magnetic storage matrix which employs tubular thin magnetic metal film elements instead of the conventional ferrite cores. It has been found that various thin metal alloy films, for example Ni–Fe films, have magnetic properties which make them useful as data storage devices. In particular, it has been found that these films exhibit the generally rectangular hysteresis loop characteristics required for matrix storage applications. Various difficulties arise in the application of such devices to this purpose, however. For example, the films are not self-supporting and must be deposited upon a substrate of one kind or another. In addition the elements, after manufacture, must be carefully trimmed to uniform lengths to insure uniformity of cells in the matrix. These and other difficulties are easily and economically overcome with the present invention, and certain of the handling and assembly problems existing in the manufacture of ferrite toroid matrices are also avoided.

Accordingly it is the principal object of the present invention to provide a magnetic storage array employing novel thin magnetic metallic film storage elements.

It is a further object of the invention to provide a manufacturing process for incorporating a plurality of thin magnetic metal film elements into a unitary, self-supporting magnetic matrix.

More specifically it is the object of this invention to produce multiple memory matrices by manufacturing a plurality of elongated tubular thin magnetic film elements supported upon cylindrical substrates, arranging the elongated elements in a coordinate array of rows and columns, fixing the elements in place by encapsulating them in a suitable encapsulating compound, and finally dividing or slicing the encapsulated block of elongated tubular elements along planes perpendicular to the longitudinal axes thereof to provide a plurality of separate magnetic element matrices.

Matrices provided in accordance with this invention enjoy the advantage that a great many uniform matrices may be constructed in a single operation and from a single group of preconstructed and pretested elongated magnetic film elements.

Matrices thus manufactured also enjoy the general advantages of the well-known ferrite plate matrices, but have none of the drawbacks of such devices. Like the ferrite plates, they are unitary and self-supporting. Moreover, they have the planar plate-like form which is required if printed wiring techniques are to be employed in providing coordinate selection and/or readout coils for the matrix. Unlike ferrite plates, they do not include excess magnetic material, and there are no magnetic paths joining storage cells. Each cell is isolated from all others by insulating material. Also, unlike ferrite plates, each cell may be pretested before incorporation into the matrix to insure that a completed matrix includes only acceptable cells.

Accordingly, it is also an object of this invention to provide a plate-type matrix of cells in predetermined aligned positions which has the general advantages of a ferrite plate matrix but which does not suffer the disadvantage thereof.

Matrices provided in accordance with this invention enjoy advantages over ferrite core matrices in that they may be fabricated in extremely small sizes. The film elements may be less than .00025 inch thick and they may be deposited upon very small substrates, for example .020 inch in outer diameter. In addition the film elements have the capability of being influenced by relatively small external orthogonal fields to enhance their switching speeds and/or lower their switching thresholds. This capability, coupled with the small size gives rise to the possibility of modes of operation not possible with ferrite core or ferrite plate matrices. Thin film elements of the kind herein described may be made with switching speeds that vary over a wide range from a few nanoseconds to several microseconds, by varying the film thickness from as thin as 2,000 A. to as thick as 60,000 A., or by introducing a controlled orthogonal field. Additionally, by varying the metal alloy composition, any desired degree of magnetic hardness may be attained.

The foregoing and other objects, features and advantages of the invention will be apparent from the following more particular description of preferred embodiments of the invention, as illustrated in the accompanying drawings.

Figure 1B:
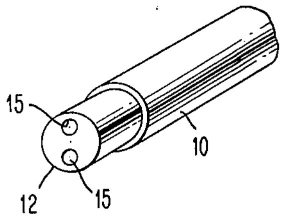
Figure 1C:
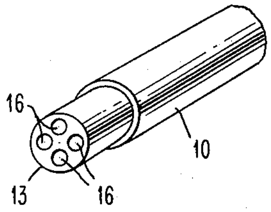
Figure 2:
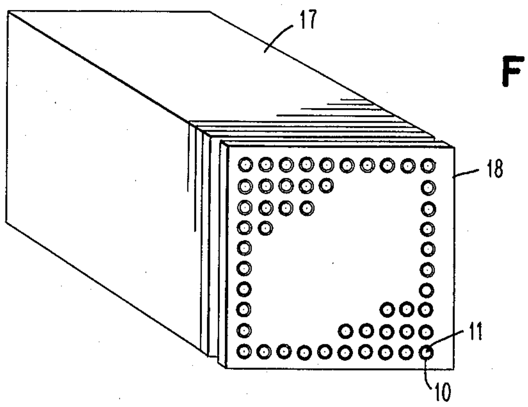
Figure 3:
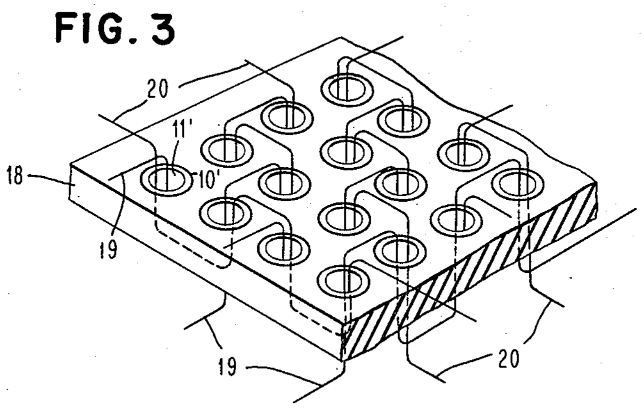

In the drawings:

FIGURES 1*a*, 1*b* and 1*c* illustrate elongated tubular thin magnetic metal film elements supported on various substrates;

FIGURE 2 illustrates a mold of the elongated elements supported in an encapsulating compound from which matrices may be divided or sliced; and FIGURE 3 illustrates a matrix prepared in accordance with the present invention through which row and column selecting wires have been threaded.

Referring now in detail to the drawings, there are shown in FIGURES 1*a*, 1*b* and 1*c* embodiments of elongated thin magnetic metal film elements 10 prepared in accordance with this invention. The elements 10 are deposited upon tubular glass, ceramic or plastic substrates 11, 12 or 13 having various numbers of axial apertures 14, 15 and 16 therein. The substrates shown are all circular in cross-section; however, other shapes, for example rectangular cross-sections, may be used if desired. The films 10 may be obtained by any known metallizing process, for example electroplating or evaporation.

By way of example, the production of a film 10 by electroplating will now be described. A plurality of similar smooth glass or ceramic tubes 5 inches to 10 inches in length and .020 inch to .100 inch in diameter are selected to serve as substrates 11. The tubes are surface coated by known chemical reduction or vacuum evaporation methods with a thin film of Ni, Cu, Cr or a similar metal, approximately 500–2000 A. thick. The purpose of this coating is to serve as a conductor during the subsequent plating operation.

After coating, a suitable Ni–Fe alloy, for example 63% Ni and 37% Fe (or 80% Ni and 20 Fe) is plated over the tubes to a thickness of about 1/16 mil. The plating operation is carried out by known methods. During plating a magnetic field is applied to each tube by a current carrying wire threaded therethrough. This field imparts a circumferential easy direction of magnetism to the films 10.

Films 10 may be produced by evaporation techniques in the following manner: A plurality of smooth glass or ceramic tubes similar to those described hereinbefore are arranged in an evaporator and a Ni–Fe film approximately 1/16 mil. thick is deposited by known evaporation techniques. A magnetic field is applied to each tube during deposition of the Ni–Fe film by a current carrying wire passing through each tube, to impart a circumferential easy direction of magnetism to the films.

Following the preparation of the elements 10, they may be subjected to various tests to insure operativeness and uniformity between samples. Acceptable samples are then arranged in a coordinate array of rows and columns, each with its axis parallel to the axes of the others, and a suitable insulating and encapsulating compound is molded around them to form a solid block 17 of imbedded elongated elements 10 as shown in FIGURE 2.

During the potting or encapsulating operation, the elements 10 are supported in proper spaced relation by means of fixtures engaging their opposite ends, or by mandrels inserted therein (not shown). Of course, once the encapsulating material has set, no further support is required.

The molding material should be fairly rigid and not brittle. Materials which create high internal stresses upon setting should be avoided. Any suitable compound meeting these general requirements may be employed. Epoxy encapsulating compounds have been used with success.

The array block 17, once the encapsulating compound has firmly set, may be divided, as by sawing, into a plurality of matrices 18 each of which is complete with storage cells arranged in accurate alignment and firmly held in place. Each storage cell in the matrix 18 consists of a uniform length section of cylindrical substrate, indicated at 11' in FIGURE 3, covered with a uniform length section of film indicated at 10'. Matrices 18 of any desired thickness may be divided off, depending upon the applications to which they are to be put. It has been found that matrices having a thickness ranging between 1/32 inch and 1/8 inch are satisfactory. After the matrices 18 have been divided from the block 17, the cut edges may be polished to attain extremely accurate thickness dimensions.

It will be appreciated that with this method of manufacture, a great many matrices 18 may be provided from a single group of the elongated tubular film elements 10. This method of manufacture thus provides an extremely cheap process for mass production of plate-like matrices of magnetic storage cells. This method of manufacture simplifies the problem of insuring that all cells 10' of a matrix 18 are trimmed to the same length, since all are divided from the elongated films 10 by the same operation. The cutting operation is made extremely simple since all elements 10 are firmly fixed in place by the encapsulating compound.

The unitary, self-supporting matrices 18 divided from the block 17 may be provided with selection and readout coils in any suitable manner. FIGURE 3 illustrates a matrix 18 which has row coils 19 and column coils 20 in the form of copper wires threaded therethrough. It will be understood, of course, that the selection and reading coils, or some of them, may be provided by printed wiring techniques as well. In fact, the matrices, being in the form of planar bodies having one or more apertures through each storage cell (depending upon which of the tubes 11, 12 or 13 are employed) are particularly well adapted for this purpose. If the matrices 18 are to be provided with printed wiring in such a manner that several conductors, for example two, are to be passed through each element 10', substrates 12 having the required number of apertures 15 may be employed. To simplify the placement of conductors by printed circuit techniques, the apertures 15 in these members 12 may be pre-metallized or rods of copper or other conductive material may be inserted therein either before or after the slicing operation. It will be apparent that one advantage of this invention resides in the fact that the storage cells may be arranged to have any desired number of apertures passing therethrough.

While a primary object of this invention is to provide magnetic storage matrices, it will be apparent that the manufacturing techniques disclosed are well adapted for the provision of thin film toroids for other purposes. With this invention, it is possible to economically produce large numbers of thin film toroids trimmed to exact lengths. If it is not desirable to employ these devices in matrix formation, the encapsulating compound of a matrix 18 may be easily dissolved away, releasing the elements 10' for use in other environments.

It should be understood that while the foregoing description has related to Ni–Fe films, the teaching hereof is applicable to other magnetic metal alloys as well. It should also be understood that the various dimensions mentioned herein, including film thicknesses, are exemplary only and are not intended to limit the invention.

While the invention has been particularly shown and described with references to preferred embodiments thereof, it will be understood by those skilled in the art that various changes in form and details may be made therein without departing from the spirit and scope of the invention.

What is claimed is:

A method of manufacturing magnetic storage matrices which include a plurality of thin magnetic film storage elements arranged in a unitary array comprising the steps of preparing a plurality of elongated tubular thin magnetic film elements by depositing thin magnetic films upon the circumferential surfaces of a plurality of cylindrical non-metallic and non-magnetic substrate members each of which has at least one axial aperture therethrough, said film being applied while each of said members is subjected to a magnetic field by a current carrying wire threaded through the aperture therein, securing the film carrying substrate members in spaced-apart relation in a coordinate array of rows and columns with their longitudinal axes parallel to one another, molding a non-magnetic insulating compound around said film carrying members, solidifying said compound to form a block having said film carrying members encapsulated therein, and dividing the block at least once along a plane perpendicular to the longitudinal axes of said elements.

References Cited by the Examiner

UNITED STATES PATENTS

| | | | |
|---|---|---|---|
| 2,700,150 | 1/55 | Wales | 29—155.5 |
| 2,877,540 | 3/59 | Austen | 29—155.5 |
| 2,906,682 | 9/59 | Fahnoe et al. | 29—155.5 |

FOREIGN PATENTS

| | | |
|---|---|---|
| 833,958 | 5/60 | Great Britain. |

JOHN F. CAMPBELL, *Primary Examiner.*
NEDWIN BERGER, *Examiner.*